United States Patent Office 3,156,575
Patented Nov. 10, 1964

3,156,575
COPPER PHTHALOCYANINE PIGMENTS OF IMPROVED DISPERSIBILITY AND STRENGTH
Louis J. Gagliano and Calvin C. Wanser, Glens Falls, N.Y., assignors to Hercules Powder Company, Wilmington, Del., a corporation of Delaware
No Drawing. Filed Feb. 5, 1962, Ser. No. 171,288
4 Claims. (Cl. 106—288)

This invention relates to phthalocyanine pigments and, more particularly, to copper phthalocyanine pigments in dry color form having improved dispersibility and to methods of preparing same.

An important object of the invention is the preparation of copper phthalocyanine pigments having improved dispersibility in plastic systems and in oleoresinous vehicle systems.

Another object of the invention is the preparation of copper phthalocyanine pigments having improved strength in plastic systems and in oleoresinous vehicle systems.

In accordance with the invention, it has been found that treatment of copper phthalocyanine pigments in the form of an aqueous suspension or slurry with relatively small amounts of certain pyrrolidone compounds affords products with improved ease of dispersion in plastic and oleoresinous vehicle systems. As a consequence of the improved dispersion, improved strength of the products is obtained.

The copper phthalocyanine pigments which have been found particularly responsive to this treatment are the alpha form of copper phthalocyanine including both the crystallizing and non-crystallizing types, the beta form of copper phthalocyanine and copper phthalocyanine green.

In the preparation of the improved products of the invention, a copper phthalocyanine pigment, in pulp form, is adjusted to a solids concentration from about 6% to about 12% with water and stirred with a conventional agitator. The desired amount of pyrrolidone compound is then added and stirring continued for a period of time from about ½ hour to about 8 hours or until the ingredients are well mixed. The resulting slurry is then subjected to high shear and/or homogenization as by a tight pass through a Charlotte or colloid mill, dried desirably at temperatures from about 60° C. to about 85° C. and then ground, as in a hammer mill, so as to pass through a 1/64" to 1/16" screen. The dried pigments, prepared as above described, shown improved ease of dispersion and strength in vinyl sheetings and quick-drying varnishes.

The pyrrolidone compounds which have been found useful herein are N-methyl-2-pyrrolidone and N-vinyl-2-pyrrolidone. The amount of pyrrolidone compound required to obtain improved dispersion will generally be from about 1% to about 10% by weight, based on the weight of pigment, with 2% appearing to be optimum. Below 1% the improvement does not appear significant enough to be of commercial value, while above 10% there is no appreciable added improvement. The specific amount will be dictated by texture requirements, economies, results desired, and so on.

The treated pigments of the present invention resemble the usual copper phthalocyanine pigments in appearance but differ therefrom in their improved dispersibility and rate of strength development. The novel pigments can be used in the coloration of plastics and in the production of ink, paint and lacquer. Incorporation of the pigments is effected according to conventional procedures. The amount of pigment incorporated in such compositions may vary but will usually be from about 2% to about 60% by weight, based on the weight of vehicle.

The following examples will illustrate the invention:

*Example 1*

An alpha form of copper phthalocyanine blue pulp, crystallizing type, was adjusted to a 7.0% solids concentration with water and stirred with a conventional agitator. An amount of N-methyl-2-pyrrolidone equal to 2% of the dry pigment weight was added directly and stirring continued for one hour. The resulting slurry was given one tight pass through a colloid mill and dried at 70° C. The dried product was hammer milled through a 1/16" screen.

Tinted vinyl sheets were prepared using untreated alpha copper phthalocyanine blue in one set as the control and the treated alpha copper phthalocyanine blue in the other set. 0.5 gram of color, 11.5 grams of titanium dioxide, and 217 grams of vinyl base were milled at 60 lbs. pressure and 300° F. on a 2-roll mill. 3, 5, 10 and 15 minute milled sheets were prepared. The treated color showed considerably less streaking and specking than the control, developed faster, and possessed greater strength.

Inks were taken on the control and treated color from successive passes on a 3-roll mill. The grinding ratio was 5 parts color to 9 parts quick-drying varnish. 400 lbs. pressure was applied to the front roller and 300 lbs. on the rear roller. Tints were made on a 50:1 paste basis using quick-drying white ink. The treated color showed greater strength when compared to the control, indicating better dispersion in the varnish.

*Example 2*

The procedure of Example 1 was followed using 10% of the dry pigment weight as N-methyl-2-pyrrolidone. Test results were the same as in Example 1.

*Example 3*

The procedure of Example 1 was followed using 2% of the dry pigment weight as N-vinyl-2-pyrrolidone. Test results were the same as in Example 1.

*Example 4*

The procedure of Example 1 was followed using 10% of the dry pigment weight as N-vinyl-2-pyrrolidone. Test results were the same as in Example 1.

*Example 5*

The procedure of Example 1 was followed using the beta form of copper phthalocyanine blue. Test results were the same as in Example 1.

*Example 6*

The procedure of Example 1 was followed using the beta form of copper phthalocyanine blue and 10% of the dry pigment weight as N-methyl-2-pyrrolidone. Test results were the same as in Example 1.

*Example 7*

The procedure of Example 1 was followed using the beta form of copper phthalocyanine blue and 2% of the dry pigment weight as N-vinyl-2-pyrrolidone. Test results were the same as in Example 1.

*Example 8*

The procedure of Example 1 was followed using the beta form of copper phthalocyanine blue and 10% of the dry pigment weight as N-vinyl-2-pyrrolidone. Test results were slightly better than those obtained in Example 7.

*Example 9*

The procedure of Example 1 was followed using copper phthalocyanine green. Test results were the same as in Example 1.

Example 10

The procedure of Example 1 was followed using copper phthalocyanine green and 10% of the dry pigment weight as N-methyl-2-pyrrolidone. Test results were slightly better than those obtained in Example 9.

Example 11

The procedure of Example 1 was followed using copper phthalocyanine green and 2% of the dry pigment weight as N-vinyl-2-pyrrolidone. Test results were the same as in Example 1.

Example 12

The procedure of Example 1 was followed using copper phthalocyanine green and 10% of the dry pigment weight as N-vinyl-2-pyrrolidone. Test results were slightly better than those obtained in Example 11.

Example 13

The procedure of Example 1 was followed using the alpha form of copper phthalocyanine blue (non-crystallizing type). Test results were the same as in Example 1.

Example 14

The procedure of Example 1 was followed using the alpha form of copper phthalocyanine blue (non-crystallizing type) and 10% of the dry pigment weight as N-methyl-2-pyrrolidone. Test results were the same as in Example 1.

Example 15

The procedure of Example 1 was followed using the alpha form of copper phthalocyanine blue (non-crystallizing type) and 2% of the dry pigment weight as N-vinyl-2-pyrrolidone. Test results were the same as in Example 1.

Example 16

The procedure of Example 1 was followed using the alpha form of copper phthalocyanine blue (non-crystallizing type) and 10% of the dry pigment weight as N-vinyl-2-pyrrolidone. Test results were the same as in Example 1.

Examples 17–24

The procedures of Examples 1, 3, 5, 7, 9, 11, 13 and 15 were followed except using 1% of the pyrrolidone compound. The test results were a little more inferior than when using 2% of the pyrrolidone compound.

It will thus be apparent that the present invention provides copper phthalocyanine pigments having improved dispersibility and strength and methods of preparing same. Moreover, these results are obtained by incorporating relatively small amounts of the pyrrolidone compound, i.e., less than 10% and usually less than 3% by weight, based on the weight of pigment, into the pigment prior to drying. The treatment, moreover, applies to all forms of copper phthalocyanine blue as well as to copper phthalocyanine green.

What we claim and desire to protect by Letters Patent is:

1. The method of preparing a copper phthalocyanine pigment having improved dispersibility and strength in plastic and oleoresinous vehicle systems which comprises forming an aqueous suspension of a copper phthalocyanine pigment, mixing therewith from about 1% to about 10% by weight, based on the weight of pigment, of a pyrrolidone compound selected from the group consisting of N-methyl-2-pyrrolidone and N-vinyl-2-pyrrolidone, and drying the resulting slurry.

2. The method of preparing a copper phthalocyanine pigment having improved dispersibility and strength in plastic and oleoresinous vehicle systems which comprises forming an aqueous suspension of a copper phthalocyanine pigment, mixing therewith from about 1% to about 10% by weight, based on the weight of pigment, of a pyrrolidone compound selected from the group consisting of N-methyl-2-pyrrolidone and N-vinyl-2-pyrrolidone, subjecting the resulting slurry to high shear, drying the slurry, and grinding the resulting product.

3. The method of preparing a copper phthalocyanine pigment having improved dispersibility and strength in plastic and oleoresinous vehicle systems which comprises forming an aqueous suspension of a copper phthalocyanine pigment, mixing therewith from about 1% to about 10% by weight, based on the weight of pigment, of a pyrrolidone compound selected from the group consisting of N-methyl-2-pyrrolidone and N-vinyl-2-pyrrolidone, homogenizing the resulting slurry, drying the slurry, and grinding the resulting product.

4. A pigment composition having improved dispersibility and strength in plastic and oleoresinous vehicle systems consisting essentially of a copper phthalocyanine pigment which has been treated with from about 1% to about 10% by weight, based on the weight of pigment, of a pyrrolidone compound selected from the group consisting of N-methyl-2-pyrrolidone and N-vinyl-2-pyrrolidone.

References Cited by the Examiner

FOREIGN PATENTS 544,261    7/57    Canada.

OTHER REFERENCES

The Condensed Chemical Dictionary, 6th Edition, Reinhold Pub. Corp., New York, 1961, page 922.

TOBIAS E. LEVOW, *Primary Examiner*